(12) United States Patent
Mihara

(10) Patent No.: US 6,558,003 B2
(45) Date of Patent: May 6, 2003

(54) ATTACHABLE/DETACHABLE SILENCER AND PROJECTION TYPE PROJECTOR APPARATUS WITH THE SAME

(75) Inventor: Hisayuki Mihara, Kodama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 37 days.

(21) Appl. No.: 09/948,789

(22) Filed: Sep. 10, 2001

(65) Prior Publication Data
US 2002/0085178 A1 Jul. 4, 2002

(30) Foreign Application Priority Data
Dec. 28, 2000 (JP) .................................... 2000-401171

(51) Int. Cl.$^7$ .................. G03B 21/00; G03B 21/18; G03B 21/26; G03B 21/14; G02F 1/1333
(52) U.S. Cl. .................. 353/52; 353/31; 353/56; 353/60; 353/61; 353/119; 353/122; 349/58; 349/161; 362/296; 165/80.1
(58) Field of Search .................. 353/31, 37, 52, 353/57, 56, 60, 61, 119, 122; 349/58, 60, 161; 362/296; 165/80.1

(56) References Cited

U.S. PATENT DOCUMENTS 6,488,378 B1 * 12/2002 Tabuchi et al. ............... 353/52

FOREIGN PATENT DOCUMENTS

| JP | 10-171362 | 6/1998 | |
| JP | 2002073037 A | * 3/2002 | ......... G10K/11/178 |
| JP | 2002151875 A | * 5/2002 | ............ H05K/7/20 |

* cited by examiner

Primary Examiner—David M. Gray
Assistant Examiner—Magda Cruz
(74) Attorney, Agent, or Firm—Pillsbury Winthrop LLP

(57) ABSTRACT

The present invention is a projection type projector apparatus which is provided with a light source portion, a light bulb and a cooler for cooling at least the light source portion, with a silencer which takes exhaust air from the cooler once to damp exhaust sound, and a mounting portion for attachably/detachably mounting the silencer to a projection type projector.

19 Claims, 8 Drawing Sheets

ATTACHABLE/DETACHABLE SILENCER AND PROJECTION TYPE PROJECTOR APPARATUS WITH THE SAME

CROSS-REFERENCE TO RELATED APPLICATIONS

This application is based upon and claims the benefit of priority from the prior Japanese Patent Application No. 2000-401171, filed Dec. 28, 2000, the entire contents of which are incorporated herein by reference.

BACKGROUND OF THE INVENTION

1. Field of the Invention

The present invention relates a silencer used in a projection type projector apparatus utilizing a light source and a light modulating element, and a projection type projector apparatus with the same.

2. Description of the Related Art

Currently, as a light source for a projection type projector, a discharge lamp of a short arc type such as a mercury lamp, a metal halide lamp or a xenon lamp is employed mainly. The discharge lamp emits light while it is being maintained in a high temperature of 1000° C. or so, and about 90% of the energy is not converted to light to be consumed as a heat generating source. Therefore, in view of a problem of reliability of an electrode, a discharge lamp, and a reflector itself which controls and reflects light, such a configuration must be employed that a reflector having a proper space according to power is provided to perform forced air cooling, or a vent hole is provided in a reflector to perform direct forced air cooling.

A conventional projection type projector apparatus will be explained using a liquid crystal projector. The liquid crystal projector is provided with a discharge lamp which is the light source, which is provided in reflector in an approximately closed state. Furthermore, a suction port and an exhaust port are provided in the projector apparatus, the fresh air is taken in via the suction port, and the fresh air is sent to a discharge lamp by a fan, and a heated air is exhausted to outside by a exhaust fan which is provided in exhaust side. As the technique describing a liquid crystal projector having such an exhausting means, there are U.S. Pat. No. 5,993,008 publication and the like.

Since the temperature of the discharge lamp is an extremely high temperature, when the hot air is exhausted as it is, exhaust air to be exhausted or discharged outside depends on an airflow speed but will has a high temperature of 100° C. or so. Such a high temperature is not preferable in view of safety.

Therefore, such a technique is employed that the speed of the hot air is increased until an arbitrary temperature can be achieved, or the hot air is mixed with a cooling air with a relatively low temperature which has been used to cool both polarizing elements, a liquid crystal panel and a polarizing plate which constitutes a light bulb, which are other parts to be cooled, so that exhaust air from the exhaust port is lowered to an arbitrary temperature.

In such a projection type projector apparatus, according to recent requirements for further small-sizing and higher output power, a higher power is required for the discharge lamp light source, while the apparatus set itself, namely, the reflector including the discharge lamp, both the polarizing elements and the polarizing plate constituting the light bulb, and the fan which is a cooling air suction side (exhaust side) cooler, is required for further small-sizing and weight reduction.

Considering the forced air cooling effected by the fan which is an ordinary cooling air suction air side (exhaust air side) cooling, when, for example, a light bulb is small-sized from 1.3 sun (which is a Japanese unit where 1 sun is equal to 1.3 inches) which is a representative value to 0.7 sun, light energy per unit area becomes 3.5 times or so correspondingly in order to maintain the same brightness. In such a case, air cooling effected by stronger air speed is required due to poor heat conductivities of almost all of the optical elements except for using expensive sapphire material for both polarizing elements or using an approach where it is difficult to secure reliability.

Especially, since it is assumed that a front projection type projector apparatus is used in a dark chamber environment, light leakage is not allowed from a main body thereof so that it becomes necessary to provide a complicated air passage and a narrow vent port, thereby increasing noises due to air cooling significantly. As a result, noises generated from a cooling apparatus become a problem not only in home use which is in a quiet house environment but also in ordinary business use.

That is, in the conventional projection type projector apparatus, there is a drawback that it is required to attain small-sizing, higher output and silence but it is much difficult to solve these conflicting demands collectively.

BRIEF SUMMARY OF THE INVENTION

In view of the above, an attachable/detachable silencer has been made or devised, and the present invention is to provide a projection type projector apparatus whose small-sizing, higher output and silence can be achieved by mounting the silencer to the apparatus only when sound or noise reduction is required without large-sizing a main body of the projection type projector apparatus, and the silencer.

According to an aspect of the present invention, there is provided a silencer which is mounted to a projection type projector apparatus provided with optical function including a light source portion and a light bulb, and cooling means for cooling at least the light source portion by blowing cooling air to the optical function, the silencer comprising a silencer main body which takes air flowing in the cooling means or cooling air flowing out of the cooling means into silencer main body to reduce suction sound or exhaust sound of the cooling means; and mounting means for attachably/detachably mounting the silencer main body to at least one of a cooling airflow suction side and a cooling airflow exhaust side of the cooling means of the projection type projector.

According to the aspect of the present invention, the silencer is made attachable/detachable so that the silencer is mounted to the projection type projector apparatus only when sound or noise reduction is required, thereby allowing small-sizing and silence of the apparatus to be achieved simultaneously.

And, according to an aspect of the present invention, there is provided a projection type projector apparatus which irradiates light whose light amount is controlled by a light bulb in a predetermined direction is provided with a light source provided inside the projection type projector apparatus; cooling means, provided within the projection type projector apparatus, for cooling at least the light source by blowing cooling air to the light source; a silencer main body which takes cooling air flowing from the cooling means into the silencer main body once to discharge the same, thereby damping suction sound or exhaust sound of the cooling means; and mounting means which attachably/detachably mounts the silencer main body on a cooling air exhaust side of the cooling means of the projection type projector apparatus such that the mounting angle of the silencer main body can be changed continuously so that an exhaust angle of the silencer main body can be changed continuously.

According to the aspect of the present invention, the projection type projector apparatus is mounted above mentioned silencer which is mounted to the projector apparatus only when sound or noise reduction is required, thereby allowing small-sizing and silence of the apparatus to be achieved, similarly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Respective embodiments of a projection type projector apparatus according to the present invention will be explained below with reference to the drawings.
(First Embodiment)

Figure 1:
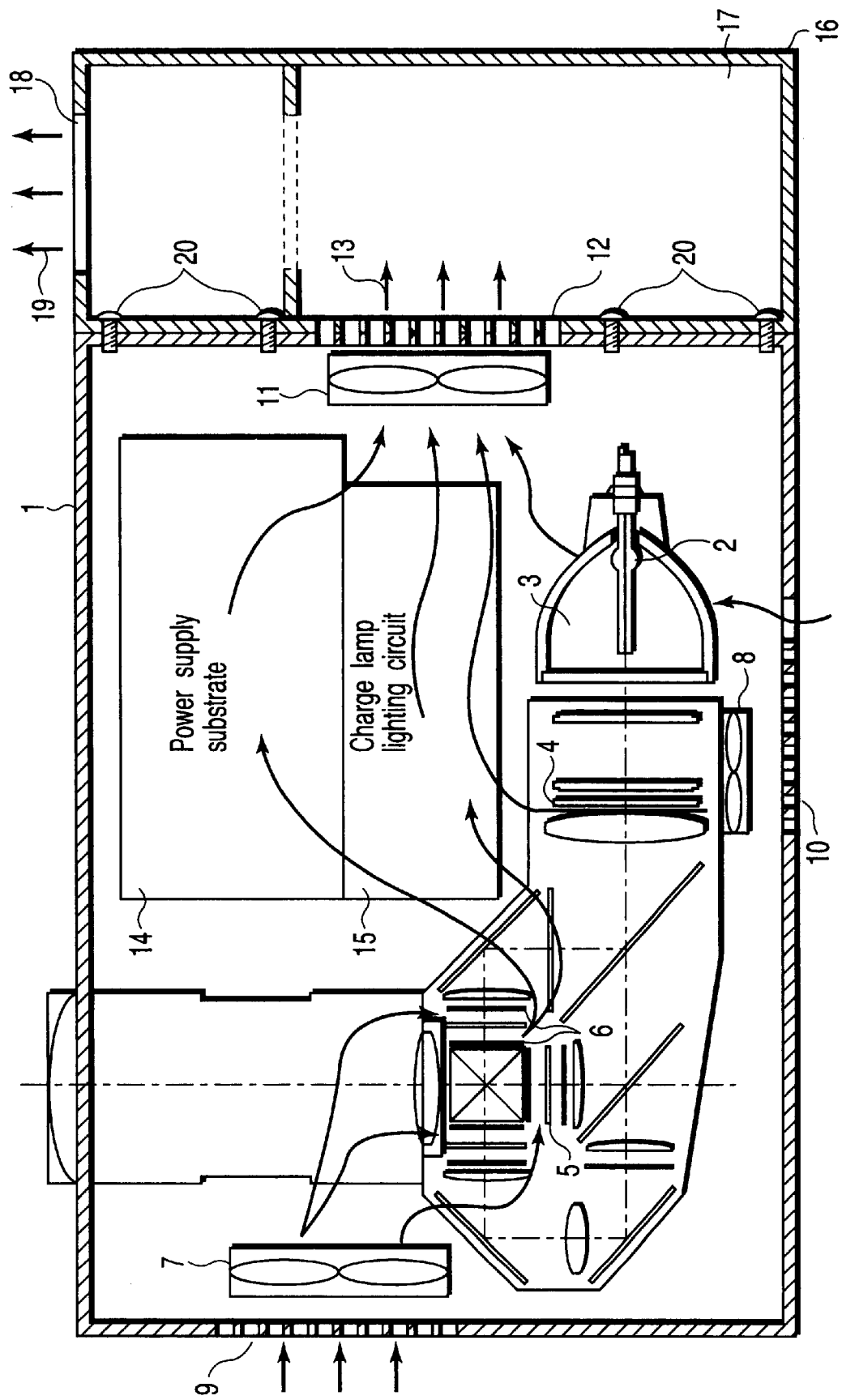
FIG. 1 is a sectional view showing one example of a projection type projector apparatus with a silencer which is a first embodiment according to the present invention.

A first embodiment is for providing a silencer for a projection type projector apparatus according to the present invention as one having an attachable/detachable structure. FIG. 1 is a sectional view showing one example of a projection type projector apparatus with a silencer which is the first embodiment according to the present invention.

In FIG. 1, a projection type projector apparatus according to the present invention is provided with a discharge lamp 2 which serves as the maximum heat generating source, a reflector 3 for generally sealing or closing the lamp 2, fans 7 and 8 which are air suction side coolers for sucking air from suction ports 9 and 10, and a fan 11 for performing air exhaust from an exhaust port 12, so that forced air cooling is conducted by room temperature air fed in by the air suction side cooling fans 7 and 8, and hot air heated by the discharge lamp is exhausted outside from the exhaust port 12 by the exhaust side cooling fan 11.

A main body 1 of the projection type projector apparatus is further provided with both polarizing elements 4 in which light from the reflector 3 is irradiated, light dividing means where light which has passes through the both polarizing elements 4 is divided by dichroic mirrors or the like to be incident on liquid crystal panels 5, polarizing plates 6 which are arranged on input sides and output sides of the liquid crystal panels 5, and projection means which composes lights emitted from the respective liquid crystal panels 5 to project the composed light. Also, the main body 1 further includes a power supply base plate 14, a discharge lamp lighting circuit 15 and the like. These members must be subjected to forced cooling effected by the fans 7, 8 and 11 such that they are cooled down to arbitrary temperatures.

The present invention is further provided with an attachable/detachable silencer 16 for reducing or damping exhaust noises of the air exhaust fan 11. The silencer 16 is structured so as to be easily attachable/detachable by using barrel holes and rivet-shaped jigs 20 (means) without necessity of, for example, screw fastening or the like. The shape of this attachable/detachable jig is not limited to the shape illustrated in the figure, but various shapes of the attachable/detachable jig can be considered according to the levels of those skilled in the art. Therefore, it should be understood that, as any attachable/detachable jig has operation and effect of the present invention, it is included in the embodiment of the present invention.

In such a silencer 16, exhaust air 13 is exhausted from the exhaust port 12, and this exhaust air includes sound or noise to be reduced or removed. Therefore, the sound or noise is absorbed while being reflected inside an interior 17 of the silencer so that the exhaust air is exhausted or discharged as exhaust air 19 from the exhaust port 18. In order to further improve or increase sound or noise reduction effect, the interior 17 of the silencer is partitioned properly so that the sound can be reduced or damped to a required level.
(Second Embodiment)

Figure 2:
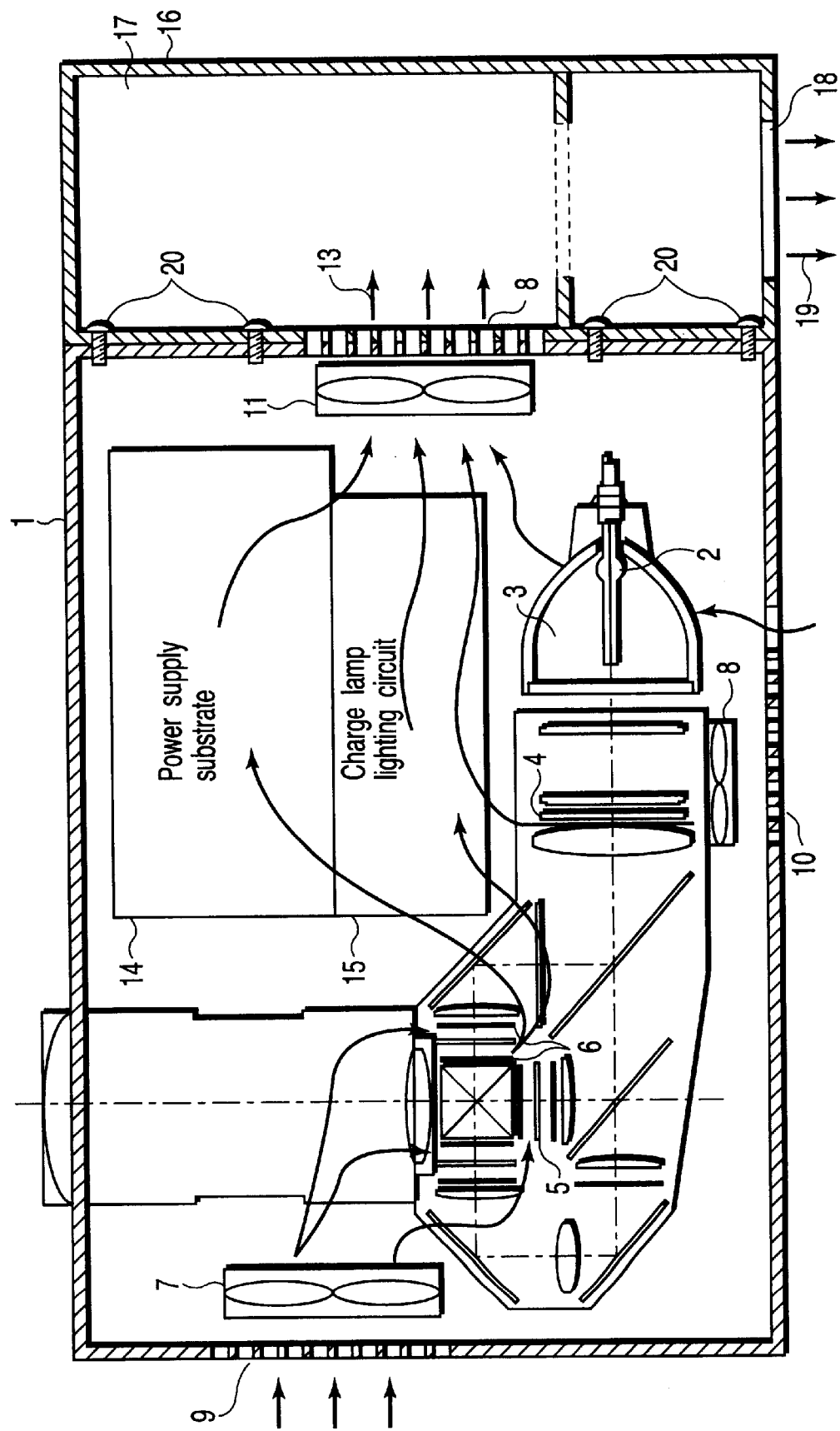
FIG. 2 is a sectional view showing one example of a projection type projector apparatus with a silencer which is a second embodiment according to the present invention.

A second embodiment includes an attachable/detachable silencer 16 like the first embodiment, but it is further structured such that a case where an exhaust port or the like is turned in a direction opposed to a direction of irradiation of a light source is specified by employing a different mounting direction of the silencer. FIG. 2 is a sectional view showing one example of a projection type projector apparatus with a silencer which is the second embodiment according to the present invention.

In a case that the exhaust port 18 is provided in the silencer 16 such as shown in FIG. 1, noises damped or reduced is exhausted together with exhaust air 19 collectively in a projection direction. Therefore, for example, when the projector apparatus is arranged on a center of a conference table, viewers are positioned on a rear side of the projector in many cases. Accordingly, such an arrangement is preferable since exhaust air with high noise level is not directed to the viewers.

In such a case as a home use of the apparatus, however, there is a case that viewers are positioned in front of the projector apparatus. In such a case, when the direction shown in FIG. 1 is employed, the exhaust air is directed to the viewers. Therefore, when viewers exist in the projection direction, comfortable environment can be provided to the viewers by positioning the exhaust port 18 in the direction opposed to the projection direction, as shown in FIG. 2. At this time, a symmetrical structure is employed for the silencer 16, namely the silencer 16 is structured such that the exhaust direction can be selected by changing the mounting direction of the silencer.

(Third Embodiment)

Figure 3:
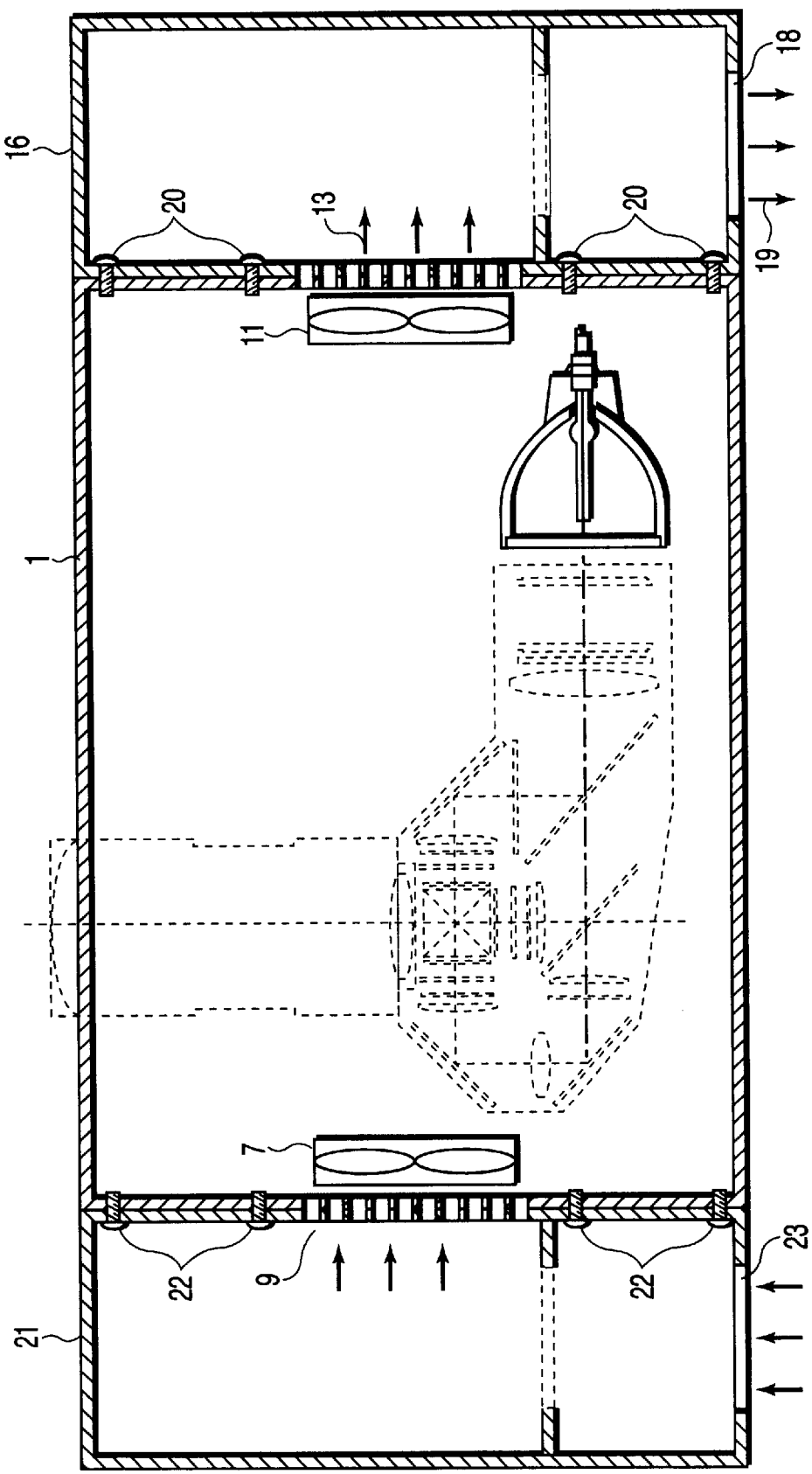
FIG. 3 is a sectional view showing one example of a projection type projector apparatus with a silencer which is a third embodiment according to the present invention.

A third embodiment shows a case where silencers are provided not only on an exhaust side of the apparatus but also on a suction side thereof. FIG. 3 is a sectional view showing one example of a projection type projector apparatus with silencers which is the third embodiment according to the present invention.

That is, there is a case where sufficiently high level noise which will cause a drawback is generated on the suction side in addition to the exhaust air acting as the noise generating source due to forced air cooling. In this case, as shown in FIG. 3, it is preferable to provide another silencer 21 having the same structure as one provided on the exhaust side diagonally regarding the front and rear faces or both side faces of the projector. This suction side silencer 21 is attachable/detachable according to necessity by attachable/detachable jigs 22 like the exhaust side silencer 21 and it is provided with a suction port 23.

(Fourth Embodiment)

Figure 4:
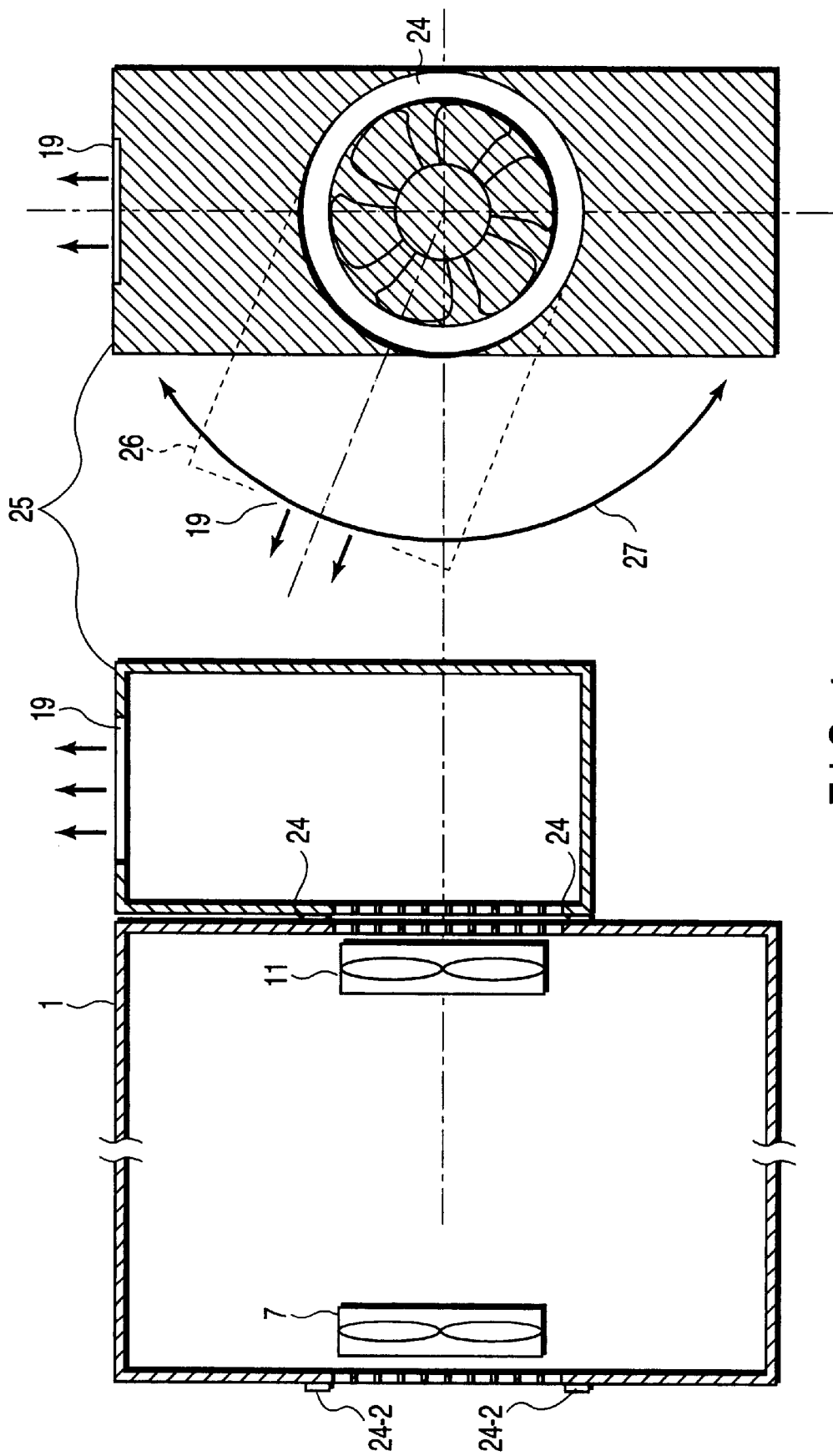
FIG. 4 is a sectional view showing one example of a projection type projector apparatus with a silencer which is a fourth embodiment according to the present invention.

A fourth embodiment provides a case that the mounting jig or fixture of the silencer described in the first embodiment has a rotating mechanism and the exhaust direction can be set freely. FIG. 4 is a sectional view showing one example of the projection type projector apparatus with a silencer which is the fourth embodiment according to the present invention.

That is, in a silencer 25 of the fourth embodiment, as shown in FIG. 4, a mounting mechanism 24 to the projection type projector apparatus 1 has a rotating mechanism, and the silencer 25 can rotate in a direction shown with, for example, arrow 27. Therefore, it becomes possible to select the exhaust direction freely and finely, for example, as shown with a dotted line 26 so that the optimal exhaust direction can be determined according to an environment where this apparatus is used. Also, a mounting mechanism 24-2 may be provided on the suction side so as to perform sound (noise) reduction on the suction side.

(Fifth Embodiment)

Figure 5:
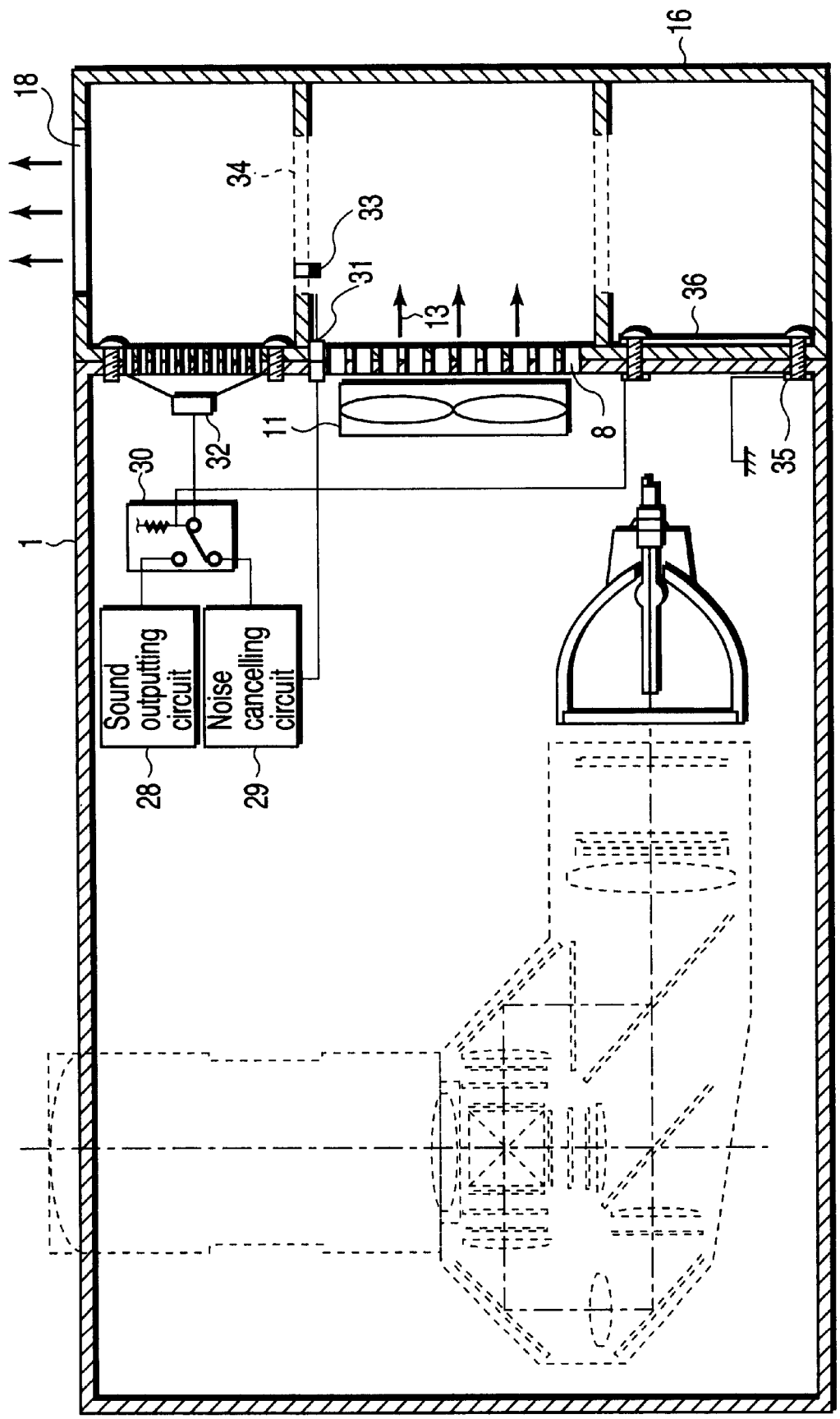
FIG. 5 is a sectional view showing one example of a projection type projector apparatus with a silencer which is a fifth embodiment according to the present invention.

A fifth embodiment specifies a case that, in addition to the silencer of the first embodiment, a microphone or the like is provided inside the silencer to detect exhaust noises and sounds or noises with a phase reverse to the exhaust noises is output by a noise canceling circuit and a speaker so that the exhaust noises are further reduced. FIG. 5 is a sectional view showing one example of a projection type projector apparatus with a silencer which is a fifth embodiment according to the present invention.

In the fifth embodiment, as shown in FIG. 5, a microphone 33 is provided within the silencer and a signal showing the exhaust noises within the silencer is transmitted to a noise canceling circuit 29 via connection terminals 31.

Here, the noise canceling circuit 29 performs phase shifting or phase reversing so as to minimize the noises generated from the vent hole 18 of the silencer on the basis of information obtained via the microphone 33 provided inside the silencer 16. By performing such a processing, it is made possible to reduce middle or lower range noise which is difficult to be damped in a cheap silencer sufficiently. (Incidentally, since high range noise has a high directionality, noise damping or reduction is easily made even by the structure shown in FIG. 5).

Incidentally, the connection terminals 31 are originally provided respectively on the silencer 16 and the projection type projector apparatus 1. It is preferable that, when a user mounts the silencer 16 on the projection type projector apparatus 1, the connection terminals 31 are connected to each other semi-automatically. When the silencer is mounted on the projection type projector apparatus, switching is performed from the sound outputting circuit 28 to the noise canceling circuit 29 automatically by operation of a selector circuit 30 so that sound output for noise reduction is obtained from the speaker 32. Thereby, two noise reduction effects can be obtained from both of the silencer and the noise canceling circuit without a special burden on a user, thereby allowing more secure noise reduction processing. Also, this embodiment is further provided with a ground connection 35 and a connection jig 36.

(Six Embodiment)

Figure 6:
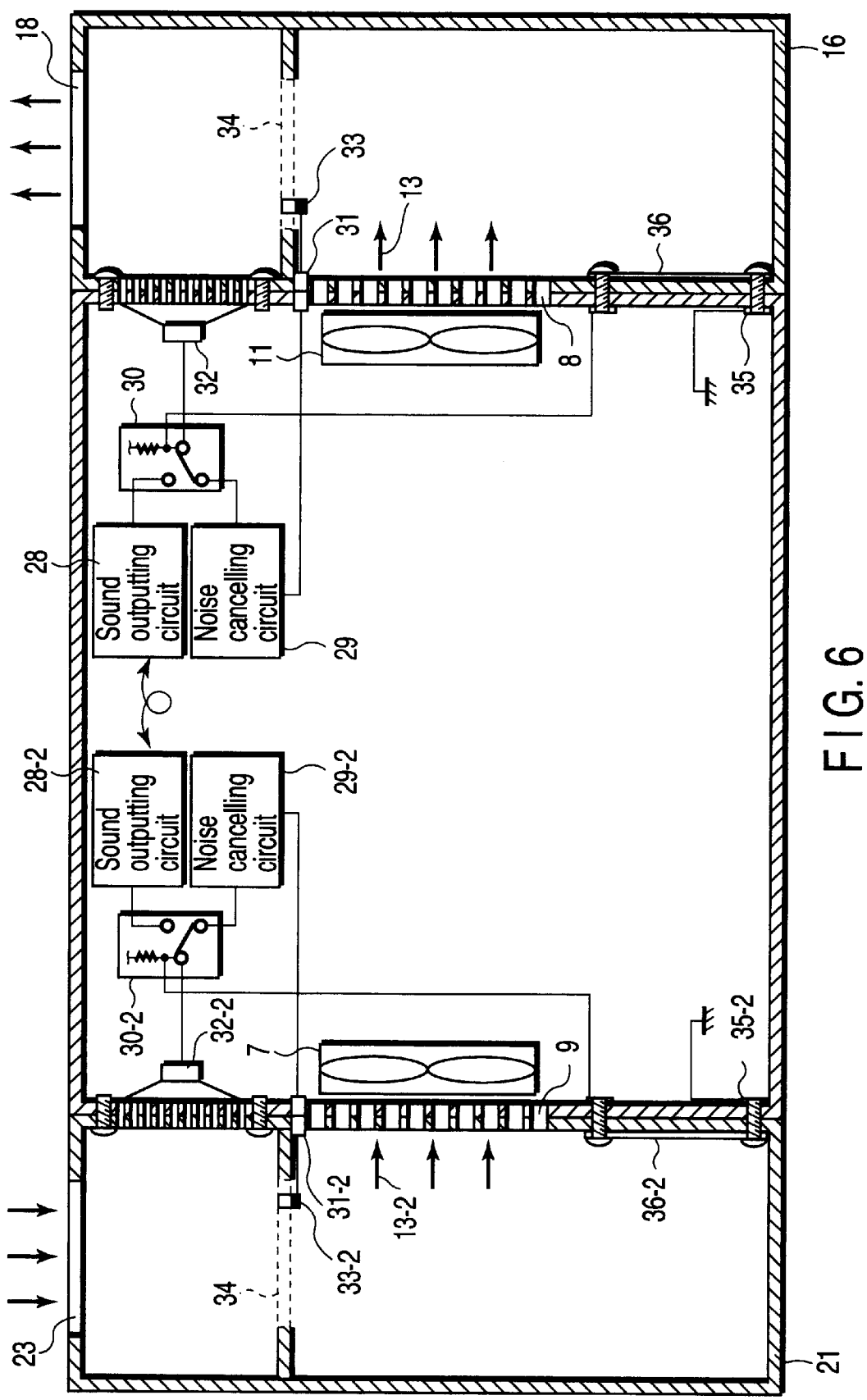
FIG. 6 is a sectional view showing one example of a projection type projector apparatus with a silencer which is a sixth embodiment according to the present invention.

A sixth embodiment is provided on its suction side with a noise canceling function in addition to the exhaust side noise canceling function of the fifth embodiment. FIG. 6 is a sectional view showing one example of a projection type projector apparatus with a silencer which is a sixth embodiment according to the present invention.

The sixth embodiment is not to provide a principle of noise canceler but to provide a sound output apparatus which functions as an ordinary sound outputting apparatus at a non-mounting time of the silencer and functions as a noise canceler at a mounting time of the silencer, and an attachable/detachable silencer simultaneously.

A projection type projector apparatus shown in FIG. 6 is provided on its suction side with a silencer 21 having a microphone 33-2 and connection terminals 31-2, and it is further provided with a sound outputting circuit 28-2 allowing a noise canceler function, a noise canceling circuit 29-2, a selector circuit 30-2, and a speaker 32-2.

According to the present invention, in a case that sound outputting apparatuses are respectively provided on suction and exhaust side faces opposed to each other and a stereophonic sound outputting apparatus is provided, as shown in FIG. 6, silencers are applicable to a plurality of faces and it becomes possible to attain an original sound reduction effect of the silencer while performing noise canceling on a suction side and an exhaust side simultaneously.

Furthermore, as shown in FIG. 6, when it is required that sound output is left or maintained according to the circumstances, the silencer 16 or 21 is mounted on only a larger noise side of the left and right side noise generating sources or a proper face of the left and right side noise generating sources, so that such a preferable looking and listening environment can be attained that the sound output is maintained by switching the operation of the sound output apparatus positioned on a non-mounting side of the silencer to a monaural sound output operation while noise canceling operation is being performed.

(Seventh and Eighth Embodiments)

A seventh embodiment is to provide a more suitable sound environment by further providing an attachable/detachable silencer.

An eighth embodiment is to provide a structure where only exhaust sound (suction sound) to be detected is provided to a noise canceling circuit by filtering signals from a microphone provided in an attachable/detachable silencer.

Figure 7:
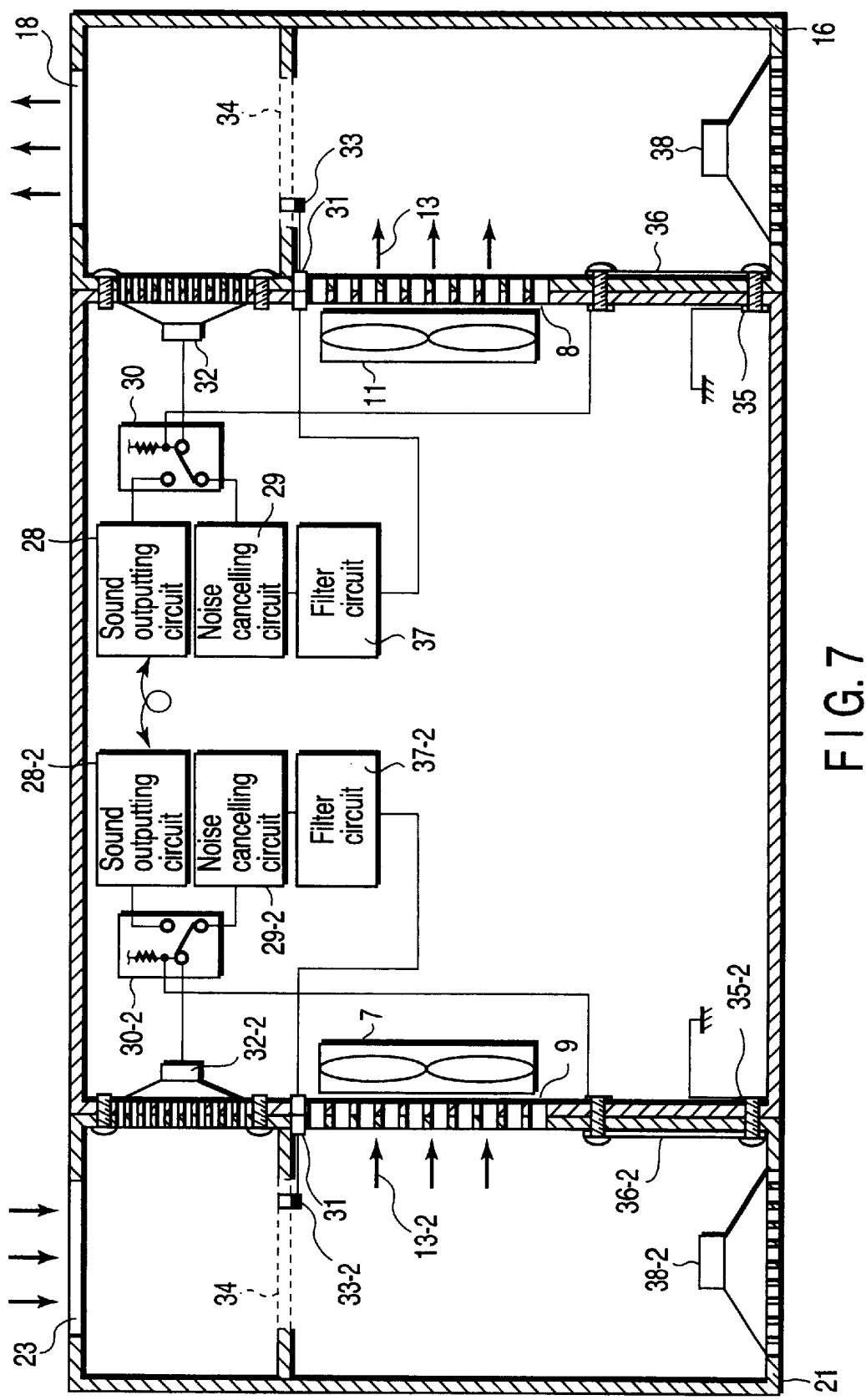
FIG. 7 is a sectional view showing one example of a projection type projector apparatus with silencers which are seventh and eighth embodiments according to the present invention.

FIG. 7 is a sectional view showing one example a projection type projector apparatus with silencers which are seventh and eighth embodiments according to the present invention.

In the seventh embodiment, the silencers 16 and 21 positioned on the exhaust side and the suction side are respectively provided with speakers 38 and 38-2. Thereby, for example, when the silencer 16 is mounted on the exhaust side of the projection type projector apparatus, the original speaker 32 functions as a speaker for noise canceling, and the speaker 38 provided in the silencer 16 functions as a speaker for sound. Regarding the silencer on the exhaust side, the same specification as the above is considered. That is, in generally, it is thought that viewers (audience) are positioned on a side opposed to the exhaust port 18 of the silencer, and such a specification is preferable.

Namely, when the sound outputting apparatus is provided in this direction, a comfortable looking and listening environment can easily be constructed and the projection type projector apparatus becomes a mobile apparatus when both the silencers are detached from the projection type projector apparatus. In addition, when the sound outputting apparatus provided in the projection type projector apparatus is caused to function as a noise canceler in a state where the silencer is mounted to the projection type projector apparatus, effective part utilization can be achieved.

In the eighth embodiment, as shown in the seventh embodiment, when both the functions of the sound outputting speaker and the noise canceler are simultaneously utilized in one silencer, there may occur a drawback that the two functions interfere with each other. Therefore, sound signals from the microphones 31 and 31-2 are caused to match with sound output signals before they are input to the noise canceling circuits 29, 29-2, or exhaust air is cause to pass through predetermined filter circuits 37 and 37-2 provided with band-pass filters corresponding to only a frequency band assumed for the frequency band generated by the fans 7 and 11 which are suction side (exhaust side) coolers. By employing such a structure, both the noise canceling function and the original function of the sound outputting apparatus can be established neither too much nor too less without affecting the original sound other than the suction sound (exhaust sound).

(Ninth Embodiment)

Figure 8:
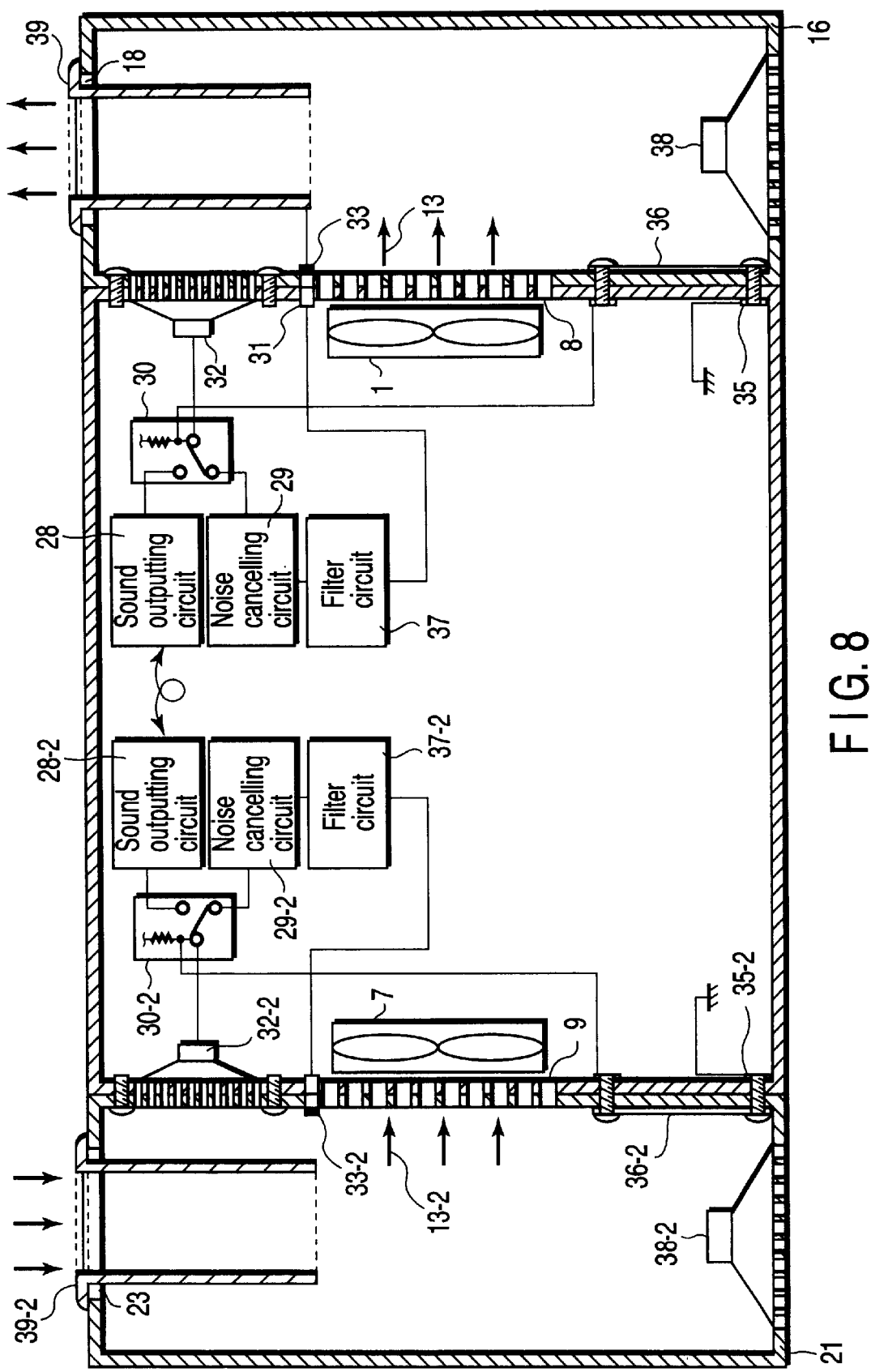
FIG. 8 is a sectional view showing one example of a projection type projector apparatus with a silencer which is a ninth embodiment according to the present invention.

A ninth embodiment is to enhance a low sound portion in addition to the original sound reduction function by further providing a basslef port 39, 39-2 in an attachable/detachable silencer. FIG. 8 is a sectional view showing one example of a projection type projector apparatus with a silencer which is a ninth embodiment according to the present invention.

The above-mentioned silencer with the sound outputting apparatus shown in FIG. 7 or the like takes a form approximating to a structure of a general speaker box where the box of the silencer is utilized as an enclosure, when viewed from another angle. Here, when an arbitrary bass reinforcing port, namely a basslef port 39, 39-2 is provided within a range meeting the cooling condition, this silencer functions as a noise damping apparatus and simultaneously it can also be established as a sound outputting apparatus excellent in a bass region regenerating ability, which has the basslef port.

Accordingly, the ninth embodiment is characterized by providing an attachable/detachable silencer and providing a sound outputting apparatus with a reinforced bass regenerating ability. According to the present invention, there can be provided a projection type projector apparatus which is provided with a silencer serving as an sound apparatus with an excellent sound performance according to the conditions of use while a priority of a mobile operation is maintained when the silencer is detached.

As mentioned above, according to the present invention, there is provided a projection type projector apparatus where, by making a silencer attachable/detachable, a sufficient quietness can be achieved by attaching a silencer to the main body of the projection type projector apparatus according to necessity without large-sizing the main body and a portability of the apparatus can be obtained by separating this silencer from the main body when the silencer is not required, and such an attachable/detachable silencer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A silencer which is mounted to a projection type projector provided with optical function including a light source portion and a light bulb, and cooling means for cooling at least the light source portion by blowing cooling air to the optical function, the silencer comprising:

a silencer main body which takes air flowing in the cooling means or cooling air flowing out of the cooling means into the silencer main body to discharge the same, thereby reducing suction sound or exhaust sound of the cooling means; and mounting means for attachably/detachably mounting the silencer main body to at least one of a cooling air suction side and a cooling air exhaust side of the cooling means of the projection type projector.

2. A silencer according to claim 1, wherein the mounting means can mount the silencer main body to the projection type projector apparatus attachably/detachably by selecting one of the same direction as an irradiation direction of the light source portion and an opposing direction thereto as a mounting direction, and suction or exhaust direction of the cooling means can be changed to the same direction as the irradiation direction or the opposing direction according to the mounting direction.

3. A silencer according to claim 1, wherein the silencer main body is mounted to an exhaust side of the cooling means, the exhaust sound is damped by taking the cooling air from the cooling means to the silencer main body once to discharge the same outside.

4. A silencer according to claim 1, wherein one of the silencer main bodies is mounted on a suction side of the cooling means, and suction sound of the cooling means is damped by taking outside air into the silencer main body as the cooling air used by the cooling means to supply the same to a suction port of the cooling means; and another of the silencer main bodies is mounted on an exhaust side of the cooling means, and exhaust sound of the cooling means is damped by taking the cooling air from the exhaust port of the cooling means into the silencer main body once to discharge the same outside.

5. A silencer which is mounted to a projection type projector provided with optical function including a light source portion and a light bulb, and cooling means for cooling at least the light source portion by blowing cooling air to the optical function, the silencer comprising:

a silencer main body which takes cooling air flowing from the cooling means into the main body to exhaust the same, thereby damping exhaust sound of the silence main body; and mounting means for attachably/detachably mounting the silencer main body on a cooling air exhaust side of the cooling means of the projection type projector apparatus such that the mounting angle of the silencer main body can be changed continuously so that an exhaust angle of the silencer main body can be changed continuously.

6. A silencer which is mounted to a projection type projector provided with optical function including a light source portion and a light bulb, and cooling means for cooling at least the light source portion by blowing cooling air to the optical function, the silencer comprising:

a silencer main body which takes air flowing into the cooling means or cooling air flowing from the cooling means into the silencer main body to discharge the same, thereby damping suction sound or exhaust sound of the cooling means;

mounting means for attachably/detachably mounting the silencer main body to at least one of a cooling air suction side and a cooling air exhaust side of the cooling means; and noise damping means for detecting suction sound or exhaust sound in the silencer main body and damping the sound by supplying a sound signal to a sound circuit of the projection type projector apparatus.

7. A silencer according to claim 6, wherein the noise damping means has suction sound damping means, provided in a first silencer main body provided on a suction port of the cooling means, for detecting suction sound, and supplying a sound signal for damping the suction sound to a sound circuit of the projection type projector apparatus; and exhaust sound damping means, provided in a second silencer main body provided on an exhaust port of the cooling means, for detecting exhaust sound and supplying a sound signal for damping the exhaust sound to the sound circuit of the projection type projector apparatus.

8. A silencer according to claim 6, further comprising:

a sound output means for receiving a sound output supplied from the sound circuit of the projection type projector apparatus and outputting sound corresponding to the sound output.

9. A silencer according to claim 6, further comprising:

sound output means, provided in the silencer main body, for receiving sound output supplied from the sound circuit of the projection type projector apparatus and outputting sound corresponding to the sound output; and a basslef port which is provided within the silencer main body and which reinforces the bass range of the sound output from the sound output means.

10. A projection type projector apparatus which irradiates light whose light amount is controlled by a light bulb in a predetermined direction comprising:

a light source provided inside the projection type projector apparatus;

cooling means, provided within the projection type projector apparatus, for cooling at least the light source by blowing cooling air to the light source;

a silencer main body which takes air flowing in the cooling means or cooling air flowing out of the cooling means into the silencer main body to discharge the same, thereby reducing suction sound or exhaust sound of the cooling means; and mounting means for attachably/detachably mounting the silencer main body to at least one of a cooling airflow suction side and a cooling airflow exhaust side of the cooling means of the projection type projector apparatus.

11. A projection type projector apparatus according to claim 10, wherein the mounting means can mount the silencer main body to the projection type projector apparatus attachably/detachably by selecting one of the same direction as an irradiation direction of the light source portion and an opposing direction thereto as a mounting direction, and suction or exhaust direction of the cooling means can be changed to the same direction as the irradiation direction or the opposing direction according to the mounting direction.

12. A projection type projector apparatus according to claim 10, wherein the silencer main body is mounted to an exhaust side of the cooling means, the exhaust sound is damped by taking the cooling air from the cooling means to the silencer main body once to discharge the same outside.

13. A projection type projector apparatus according to claim 10, wherein one of the silencer main bodies is mounted on a suction side of the cooling means, and suction sound of the cooling means is damped by taking outside air into the silencer main body as the cooling airflow used by the cooling means to supply the same to a suction port of the cooling means; and another of the silencer main bodies is mounted on an exhaust side of the cooling means, and exhaust sound of the cooling means is damped by taking the cooling airflow from the exhaust port of the cooling means into the silencer main body once to discharge the same outside.

14. A projection type projector apparatus which irradiates light whose light amount is controlled by a light bulb in a predetermined direction comprising:

a light source provided inside the projection type projector apparatus;

cooling means, provided within the projection type projector apparatus, for cooling at least the light source by blowing cooling air to the light source;

a silencer main body which takes cooling air flowing from the cooling means into the silencer main body once to discharge the same, thereby damping suction sound or exhaust sound of the cooling means; and mounting means which attachably/detachably mounts the silencer main body on a cooling air exhaust side of the cooling means of the projection type projector apparatus such that the mounting angle of the silencer main body can be changed continuously so that an exhaust angle of the silencer main body can be changed continuously.

15. A projection type projector apparatus which irradiates light whose light amount is controlled by a light bulb in a predetermined direction comprising:

a light source provided inside the projection type projector apparatus;

cooling means, provided within the projection type projector apparatus, for blowing cooling air to the light source in order to cool at least the light source;

a silencer main body which takes air flowing into the cooling means or cooling air flowing from the cooling means into the silencer main body to discharge the same, thereby damping suction sound or exhaust sound of the cooling means;

mounting means for attachably/detachably mounting the silencer main body in the vicinity of the cooling means of the projection type projector;

noise damping means, provided within the silencer main body, for detecting suction sound or exhaust sound within the silencer main body and outputting a sound signal for damping the sound; and canceling means for canceling the suction sound or the exhaust sound on the basis of the sound signal output from the noise damping means.

16. A projection type projector apparatus according to claim 15, wherein the noise damping means has suction sound damping means which is provided in a first silencer main body provided on a suction port of the cooling means and which supplies a sound signal for detecting suction sound and damping the same to the canceling means, and an exhaust sound damping means which is provided in a second silencer main body provided on an exhaust port of the cooling means and which supplies a sound signal for detecting exhaust sound and damping the same to the canceling means.

17. A projection type projector apparatus according to claim 15, further comprising:

sound output means for outputting sound from the canceling means.

18. A projection type projector apparatus according to claim 15, wherein the canceling means has filter means for receiving sound signal from the noise damping means and causing the sound signal to pass through a band-pass filter with a predetermined frequency band, thereby damping sound other than the suction sound or exhaust sound in the silencer main body.

19. A projection type projector apparatus according to claim 15, further comprising:

a basslef port which is provided within the silencer main body and which reinforces the bass range of the sound output from the sound output means.

* * * * *